Patented Dec. 22, 1953

2,663,736

UNITED STATES PATENT OFFICE 2,663,736

PREPARATION OF SUBSTITUTED PHOSPHA-CYCLOPENTENE DIHALIDES

William B. McCormack, Wilmington, Del., assignor to E. I. du Pont de Nemours and Company, Wilmington, Del., a corporation of Delaware No Drawing. Application August 7, 1951,
Serial No. 240,807

8 Claims. (Cl. 260—607)

This invention relates to organic phosphorus compounds and particularly to substituted phosphacyclopentene dihalides.

It has been found that certain phosphine oxides in which the phosphorus is a member of a heterocyclic ring are highly useful as insecticides. They are especially effective against aphids and two-spotted mites. Phosphine oxides of this type and the processes of making them are disclosed in copending applications, Ser. Nos. 240,808 and 240,810. These compounds may be prepared from the phosphacyclopentene dihalides to which this application relates.

It is an object of this invention to provide a process for the preparation of substituted phosphacyclopentene dihalides which act as intermediates in the preparation of phosphine oxides having insecticidal activity.

According to this invention, substituted phosphacyclopentene dihalides are formed by the reaction between conjugated dienes and mono-substituted phosphorus dihalides. In a typical and representative embodiment of this invention, 1-phenyl-1-phospha-3-cyclopentene-P-dichloride is prepared by the reaction between butadiene and dichlorophenylphosphine, as follows:

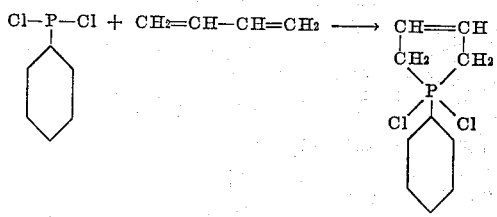

The conjugated dienes which are suitable for the practice of this invention are those Diels-Alder dienes which are free from carbonyl and cyano groups and which contain the grouping

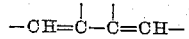

in which grouping no carbon atom is a member of an aromatic ring and no three carbon atoms are members of the same cycloaliphatic ring, all substituents on the terminal carbon atoms of the said grouping being in the trans configuration. By the term "Diels-Alder diene" is meant any compound containing a conjugated double bond which is capable of taking part as the diene in the well known Diels-Alder reaction with unsaturated compounds such as maleic anhydride, acrolein and the like. The compounds which are capable of taking part in the Diels-Alder reaction are discussed in a chapter by Kurt Alder entitled "The Diene Synthesis" at page 381 in "Newer Methods of Preparative Organic Chemistry" Interscience Publishers, Inc. (1948). The Diels-Alder reaction is very general and most compounds containing conjugated double bonds are operative as the dienes in this synthesis, although as stated in the Alder chapter, some such compounds react very slowly or not at all. Compounds containing the butadiene skeleton and having large substituents in the 2 and 3 positions tend to react slowly, possibly because the bulky substituents interfere with free rotation around the central carbon to carbon linkage, and large or electro-negative substituents in the 1 and 4 positions also play a part in retarding reaction.

The present invention contemplates the use of only those dienes which are capable of taking part in the ordinary Diels-Alder synthesis and which satisfy the other requirements set forth above. They must contain the grouping

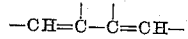

i. e., they must contain the butadiene carbon skeleton and have no more than one substituent on each of the terminal carbon atoms in this skeleton. They must also be free from cyano (—C≡N) groups or from carbonyl (—C=O) groups such as occur in ketones, aldehydes, acids and esters. Compounds of this sort, such as ethyl sorbate ( $CH_3-CH=CH-CH=CH-CO_2C_2H_5$ ) and 1-cyano-1,3-butadiene, react satisfactorily with the dihalophosphine but are difficult to isolate in monomeric form because of the tendency for the formation of macromolecules through polymerization.

The dienes suitable for use in the process of this invention contain a butadiene skeleton of which no carbon atom is part of an aromatic ring and no three carbon atoms are part of the same cycloaliphatic ring. Compounds in which only two of the carbon atoms are members of a cycloaliphatic ring or in which each of the double bonds is bridged with a polymethylene radical such as in the compound 1,1'-bis-cyclohexenyl, may be employed.

When the butadiene structure is substituted in its 1 or 4 position or both, it is necessary that the substituents have the trans configuration with respect to the other vinyl group. When the terminal substituent is in a cis position the reaction is greatly inhibited on account of the spatial relationships. The cis and trans configurations may be illustrated as follows:

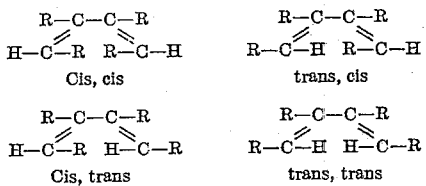

A diene which comprises a mixture of trans, trans isomers together with some of the other three types may be used in the reaction. In such a case the reaction takes place predominantly with the all-trans compound.

The preferred dienes may be represented by the formula:

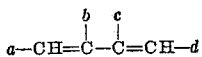

in which $a$, $b$, $c$ and $d$ represent members of the class consisting of hydrogen, alkyl, alkenyl, aryl, aralkyl, alkoxy, chlorine and bromine and tetramethylene groups which together with two adjacent carbon atoms in the heterocyclic ring form a cycloaliphatic ring, no more than a total of 6 carbon atoms being present in $a$, $b$, $c$ or $d$ in the form of aliphatic substituents and no more than 3 aromatic rings being present, substituents on the terminal carbon atoms of the butadiene structure being in the trans configuration.

Conjugated dienes which are representative of the many compounds which are suitable for this reaction are as follows:

Butadiene
Mono-, di- and trimethylbutadienes
1,2,3,4-tetramethylbutadiene
Mono-, di- and triethylbutadienes
1,2,3,4-tetraethylbutadiene
Mono-, di- and tripropylbutadienes
1,2,3,4-tetrapropylbutadiene
Monovinylbutadienes
Monophenylbutadienes
2,3-diphenylbutadiene
Monotolylbutadienes
Monobenzylbutadienes
Myrcene (2-methyl-6-methylene-2,7-octadiene)
Alloocimene (2,6-dimethyl-2,4,6-octatriene)
1,1'-bis-cyclohexenyl
2-chlorobutadiene (chloroprene)
2-bromobutadiene
Monomethoxybutadienes
Monoethoxybutadienes
1,2-dimethylenecyclohexane
1-vinyl-1-cyclohexene In each of the compounds listed above in which more than one substituent is present, it is to be understood that each substituent is attached to a different carbon atom in the butadiene structure.

The preferred dienes are butadiene, chloroprene, isoprene and myrcene.

The dihalophosphine to be used in this process has the formula $RPX_2$, in which R represents a member of the group consisting of alkyl, aryl, alkaryl, aralkyl, alkoxyaryl, haloaryl and haloalkyl radicals and X represents a member of the group consisting of chlorine and bromine. The preferred dihalophosphines are dichlorophenyl- phosphine and dichloroethylphosphine and the corresponding dibromo compounds. A wide variety of phosphine derivatives having the general formula shown may be employed. Representative compounds include those in which R represents an alkyl group such as methyl, ethyl, propyl or octyl; an aryl group such as phenyl or alpha or beta naphthyl; an alkaryl group such as o- or p-ethylphenyl, p-tolyl or p-xylyl; an aralkyl group such as benzyl or phenylethyl; an alkoxyaryl group such as o- or p- methoxyphenyl, o- or p- ethoxyphenyl or alpha-methoxynaphthyl; a haloaryl group such as o- or p- chloro- or bromophenyl or 3-chloro-4-methylphenyl; or a haloalkyl group such as beta-chloroethyl or bromoethyl or 2-chloro-1-octyl. In general, the lower members of these classes of radicals are most useful. These compounds are readily available from several well-known procedures, such as by the action of phosphorus trichloride on a compound having the formula RH, in the presence of aluminum chloride, or by the action of phosphorus trichloride on dialkyl or diaryl mercury. Kharasch in J. Org. Chem. 14, 429 (1949) describes a process for making dichloroethylphosphine from phosphorus trichloride and lead tetraethyl. The various procedures for making these compounds are summarized in Kosolapoff, Organophosphorus Compounds, Wiley, New York (1950), chapter 3.

The preferred substituted phosphacyclopentene dichlorides formed according to the present invention have the formula:

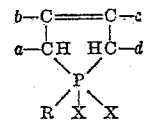

in which $a$, $b$, $c$ and $d$ have the significance described above in connection with the description of the preferred dienes, and in which R has the significance described above in connection with the definition of the dihalophosphines.

The reaction between the diene and the dihalophosphine is ordinarily conducted at a temperature between 0° C. and 100° C. Higher temperatures may be used if the particular materials involved are not thereby decomposed. If any solid components are present in the reaction mixture the temperature is preferably maintained at a high enough level to keep the solids in a molten condition. The reaction will usually be carried out at atmospheric pressure although higher or lower pressures may be used.

The two reactants may be used in equimolar amounts or either may be present in excess. It is often convenient to employ an excess of one reactant or the other to serve as a reaction medium. As the diene is usually more easily recovered, this will be the ordinary choice for this purpose. The reaction may be conducted in the presence of a non-reactive medium such as petroleum ether, cyclohexane, benzene, diethyl ether, dioxane, carbon tetrachloride, chloroform and the like, although a higher rate of reaction is usually obtained when no inert diluent is used. In contrast, the rate of reaction is increased by use of an excess of one of the reactants. The mixture should be free of substances capable of converting the dihalophosphine to the corresponding oxide, such as water, alcohols, carboxylic acids and the like.

Stirring may be advantageous to give better mixing after the product has begun to deposit. The dihalophosphine tends to be absorbed by the product and thus to become unavailable for further reaction. This effect is minimized by the use of efficient agitation.

The heterocyclic phosphine dihalides which are formed according to this reaction are obtained in crude form and are not isolated as such, but are converted directly to the corresponding phosphine oxides. The reaction mixture containing the excess reactants and the heterocyclic phosphine dihalide may be treated with water to form the phosphine oxide which may then be recovered by neutralizing, salting, extracting with a solvent such as chloroform and distilling. A preliminary separation of the phosphine dihalide from other compounds in the reaction mixture may be performed by diluting and washing with petroleum ether or other non-hydrolyzing solvent. Polymeric reaction products are not removed by this treatment, nor may they be separated by distillation of the monomeric dihalides, since the dihalides are subject to pyrolytic decomposition. The separation may readily be performed after conversion to the phosphine oxides.

Both monomeric and polymeric reaction products are usually formed during the course of the reaction and in order to obtain a satisfactory yield of the monomeric phosphine dihalide, it is often desirable to add a small amount of a polymerization inhibitor which does not react with dihalophosphines and is a free-radical inhibitor. Suitable materials for this purpose are copper organic salts such as copper stearate or and rhodamine, and polynitro compounds such as trinitrobenzene, dinitrobenzene and trinitrotoluene. Usually from 0.1 to 2.0 percent of the inhibitor based on the weight of the reaction mixture is sufficient. Certain of the diene reactants have less tendency toward polymerization than others and in some cases satisfactory yields of the monomeric product may be obtained in the absence of an inhibitor.

The speed of the reaction between the diene and the dihalophosphine varies considerably, depending on the specific nature of the reactants, the temperature, the presence or absence of a solvent and its identity, the amount of agitation and so on. In many cases, reaction is substantially complete in a few hours while in some cases four to five days are required. Many monosubstituted dienes react faster than does butadiene. Isoprene and 2-phenylbutadiene show this effect. Dibromophosphines produce faster reactions than do the corresponding dichloro compounds. The reaction between 1,2-dimethylenecyclohexane and dibromophenylphosphine is nearly complete within thirty minutes when carried out at 60° C.

In the illustrative examples of this process which follow, most of the reaction mixtures are permitted to stand for extended times up to several months in order to show the yield of product which may be obtained when there is opportunity for equilibrium to be reached. It is to be understood that in nearly all cases the addition reaction is substantially complete within the early portion of this time.

*Example 1*

A solution of 227 g. (4.20 m.) of butadiene and 5.0 g. of copper stearate in 750 g. (4.19 m.) of dichlorophenylphosphine is allowed to stand in a closed container at room temperature for nineteen days. The monomeric phosphine dichloride adduct appears in the bottom of the container throughout this time in the form of a very viscous, dark red oil.

The reaction mixture is diluted with petroleum ether, the supernatant portion is decanted, and the product is washed with additional petroleum ether and then converted to the corresponding phosphine oxide by adding it to one liter of ice-water mixture. The resulting essentially homogenous solution is partially neutralized with an aqueous 30% sodium hydroxide solution, and then treated with sodium bicarbonate to give a pH of about 8. The resulting solution is saturated with salt and extracted with chloroform. Distillation of the extract produces 279 g. of a crude oil boiling at 169–178° C. (0.5–0.7 mm.), and 325 g. of residue. The oil represents a 37% yield of monomeric phosphine oxide adduct. The residue consists largely of polymeric materials.

Purification of the product is then carried out. To a solution of 228 g. of crude monomeric adduct in 800 cc. of water is added 50 cc. of a 3% aqueous hydrogen peroxide solution. The resulting solution is brought to a pH of about 8 with sodium bicarbonate, then saturated with salt and extracted with chloroform. Concentration and distillation gives 220 g. of a product boiling at 153–155° C. (0.2 mm.) or 158–160° C. (0.4 mm.), and about 2 g. of residue. This product solidifies to a white solid having a melting range of 67–75° C. Its phosphorus content is found to be 17.4% (theoretical for 1-phenyl-1-phospha-3-cyclopentene-P- oxide 17.33%).

*Example 2*

In a manner similar to that described in Example 1, 1210 g. of butadiene are treated with 4000 g. of dichlorophenylphosphine in the presence of 10 g. of phenothiazine and 10 g. of trinitrobenzene as polymerization inhibitors. The reaction is conducted at 60–100° C. over a period of four days. The phosphine dichloride product is washed and converted to the oxide by the procedure of Example 1 (without $H_2O_2$ purification) giving a 13% yield of monomeric phosphine oxide adduct boiling at 145–150° C. (0.2 mm.).

*Example 3*

In another similar run, 75.5 g. of butadiene are treated with 1000 g. of dichlorophenylphosphine (4:1 m. ratio) in the presence of 5 g. of copper stearate at room temperature for twelve days. After hydrolysis by the procedure described in Example 1, this produces a 51% yield of a crude monomeric phosphine oxide adduct, having a boiling range of 170–173° C. (0.7 mm.).

*Example 4*

A solution of 500 g. (2.79 m.) of dichlorophenylphosphine, 2.0 g. of copper stearate and 190.0 g. (2.79 m.) of isoprene is allowed to stand at 30–35° C. for forty-five days. It is observed that most of the material has reacted in fifteen days. The initially formed red viscous lower layer almost completely crystallizes to yellow, compact needle clusters at the end of the forty-five day period.

The phosphine dichloride product is washed with petroleum ether, and the soluble materials are removed by decantation. Hydrolysis of the mixed solid-oil residue with water gives a clear solution. Working up the product in the manner described for Example 1 produces a viscous liquid which upon distillation gives a product boiling over the range 165–169° C. (0.2 mm.). This crude product is purified in the manner described in Example 1 using hydrogen peroxide, giving 362.3 g. of a colorless viscous liquid boiling at 172–174° C. (0.2 mm.), a 67.5% yield. This liquid solidifies on cooling. A portion of this product is sublimed and then analyzed with the following results:

Calcd. for $C_{11}H_{13}OP$: C=68.73%; H=6.82%; P=16.12%. Found: C=68.8%; H=7.0%; P=15.9%.

*Example 5*

Repeating Example 4, using 38.0 g. of isoprene, 200 g. of dichlorophenylphosphine and 0.5 g. of copper stearate, and allowing the mixture to stand about one day at room temperature, two days at 60° C. and then twenty-eight days at room temperature, produces a 61% yield of crude monomeric phosphine oxide adduct boiling at 175–200° C. (0.6 mm.).

*Example 6*

Again Example 4 is repeated, this time using 19.0 g. of isoprene, 200 g. of dichlorophenylphosphine and 0.2 g. of trinitrobenzene. The reaction is conducted at 60° C. for about one day and at room temperature for another day, and the red, viscous oily phosphine dichloride adduct hydrolyzed to give a 66% yield of crude monomeric phosphine oxide adduct boiling at 160–164° C. (0.7 mm.).

*Example 7*

A mixture of 179.0 g. (1 m.) of dichlorophenylphosphine 2.0 g. of copper stearate and 82.1 g. (1 m.) of 1,3-dimethylbutadiene is allowed to stand at 35–40° C. for two months. A dark red-brown viscous lower layer is formed.

Hydrolyzing the phosphine dichloride adduct with water gives two layers. This is worked up and extracted as in Example 1. After distillation, there are obtained 113 g. of crude oxide, boiling at 210–215° C. (14 mm.), representing a 55% yield of monomeric phosphine oxide adduct. After purification there remain 103 g., boiling at 202–208° C (8 mm.), containing 15.0% P.

*Example 8*

A mixture of 300 g. (1.67 m.) of dichlorophenylphosphine, 1.0 g. of copper stearate and 228 g. (1.67 m.) of myrcene (2-methyl-6-methylene-2,7-octadiene) is allowed to stand for forty-five days at 30–35° C. The product appears in the form of a viscous red lower layer. This is hydrolyzed and worked up as described in Example 1, giving 237 g. of a colorless oil boiling at 210–225° C. (0.04 mm.), and 70 g. of a hard residue. The colorless oil ($n_D^{24}$ 1.5662) represents a 54% yield calculated as the monomeric adduct in oxide form. Purification with hydrogen peroxide as described in Example 1 produces a main cut of 165 g. (38% yield) of an oil having a boiling range of 192–193° C. (0.2 mm.), or 206° C. (1.0 mm.), and $n_D^{25}$ 1.5592. The main cut analyzes as follows:

Calcd. for $C_{16}H_{21}OP$: C=73.85%; H=8.15%; P=11.91%. Found: C=74.1%; H=8.4%; P=12.1%.

When this procedure is repeated using 4 m. of myrcene, a 52% yield of product is obtained having a boiling range of 220–226° C. (1.2–2.0 mm.), together with a 21% yield of residue. These products are obtained after the reaction mixture has stood for sixty-five days at 30–35° C.

*Example 9*

A mixture of 50.0 g. (0.279 m.) of dichlorophenylphosphine, 0.5 g. of copper stearate and 38.1 g. (0.279 m.) of alloocimene (2,6-dimethyl-2,4,6-octatriene) is allowed to stand at 30–35° C. for thirty-four days. Nearly the entire mixture is converted to phosphine dichloride adduct in the form of a viscous, red oil.

This oil is worked up in the manner described in Example 1. Distillation of the hydrolyzed and washed crude product gives a main cut of 34.5 g. boiling at 200–205° C. (1.5 mm.) and 17.1 g. of residue. The 200–205° C. cut represents a 47% yield of crude monomeric adduct. Redistillation of this fraction gives a main cut of 21.6 g. of a red-orange liquid boiling at 160–161° C. (0.3 mm.), with 6.4 g. of a very viscous red residue. The 160–161° C. cut is analyzed as follows:

Calcd. for $C_{16}H_{21}OP$: P=11.91%. Found: P=11.6%.

The final main fraction appears to be substantially pure monomeric adduct in 30% overall yield.

*Example 10*

A mixture of 22.6 g. (0.13 m.) of dichlorophenylphosphine, 0.5 g. of copper stearate and 20.5 g. (0.13 m.) of 1,1′-bis-cyclohexenyl is allowed to stand for twenty days at room temperature. After three days some solid has formed, but subsequent reaction gives the phosphine dichloride adduct predominantly as a thick oil.

Working up and hydrolyzing this oil as in Example 1 gives 8.4 g. of a very viscous oil having a boiling range of 210–220° C. (0.5 mm.) and 2 g. of residue. The oil represents a 25% yield of the monomeric phosphine oxide adduct. This cut analyzes as follows:

Calcd. for $C_{18}H_{23}OP$: P=10.83%. Found: P=11.2%.

*Example 11*

A mixture of 200 g. (1.12 m.) of dichlorophenylphosphine, 1.0 g. of trinitrobenzene and 24.7 g. (0.28 m.) of 2-chlorobutadiene is heated at 55–60° C. for sixty hours, then allowed to stand at room temperature for forty-eight hours. The red, oily phosphine dichloride product is worked up and hydrolyzed as in Example 1, giving 21.8 g. of a material boiling at 190–240° C. (3.5 mm.) representing a 37% yield calculated as monomeric phosphine oxide adduct, and 21.1 g. of a residue representing a 36% yield calculated in the same manner. The distillate solidifies on standing and is purified by the procedure described in Example 1 to give a colorless oil boiling at 158–164° C. (0.1 mm.), which solidifies on standing. This solid analyzes as follows:

Calcd. for $C_{10}H_{10}OClP$: C=56.52%; H=4.74%; Cl=16.68%; P=14.58%. Found: C=56.4%; H=4.7%; Cl=16.7%; P=14.6%.

The same procedure is followed using 24.7 g. (0.28 m.) of chloroprene (2-chloro-1,3-butadiene), 50 g. (0.28 m.) of dichlorophenylphosphine and 5 g. of copper stearate. The reaction is conducted at 30–35° C. for forty-five days, and a 27% yield of material boiling at 200–220° C. (1–3 mm.) is obtained.

*Example 12*

A mixture of 25 g. (0.14 m.) of dichlorophenylphosphine, 2.5 g. of copper stearate, and 18.6 g. (0.14 m.) of 2-bromo-1,3-butadiene is allowed to stand at 35–40° C. for twenty-five days. After about fifteen days most of the reaction mixture has changed to the phosphine dichloride crude product, a mixture of a viscous tar and a yellow solid. By working up and hydrolyzing this product as in Example 1, there is obtained 18.9 g. of a material boiling at 160–165° C. (0.5 mm.)., representing a 53% yield calculated as monomeric phosphine oxide adduct, and in addition 3.9 g. of residue.

Example 13

Using the procedure described in Example 1, 12 g. of butadiene are treated with 50 g. of dibromophenylphosphine in the presence of 1.0 g. of copper stearate, at room temperature for seven days. The resulting creamy-yellow monomeric adduct gives a phosphine oxide, boiling at 139–142° C. (0.5 mm.), in 61% yield.

Example 14

Similarly, 12.7 g. (.187 m.) of isoprene are reacted with 50 g. (.187 m.) of dibromophenylphosphine in the presence of 0.5 g. of copper stearate for two days at 35–40° C. The creamy-yellow phosphine dibromide is hydrolyzed to monomeric phosphine oxide adduct boiling at 143–144° C. (0.3 mm.). This product is obtained in 78% yield, and contains 15.7% P (theory 16.1%).

When the mole ratio of dibromophenylphosphine to isoprene is increased to 1.2:1 and the reaction time to three days, the phosphine dibromide adduct is again obtained as a creamy-yellow solid. This solid is worked up and hydrolyzed in the same way, giving a 91.5% yield of the phosphine oxide boiling at 164–183° C. (1.0 mm.).

Example 15

The reaction of 20.0 g. of chloroprene with 50 g. of dibromophenylphosphine in the presence of 1.0 g. of copper stearate at 35–40° C. for five days produces the dibromide adduct as a brown solid and gives a 53% yield of monomeric phosphine oxide adduct boiling at 161–170° C. (0.5 mm.).

Example 16

The reaction of 18.4 g. of 2,3-dichloro-1,3-butadiene with 40 g. of dibromophenylphosphine in the presence of 1 g. of copper stearate for nine days at 35–40° C. produces the corresponding phosphine dibromide adduct, a red-brown solid.

Hydrolysis of this material by the procedure of Example 1 gives a red oil which is methanol-soluble, and from which small amounts of monomeric adduct can be obtained.

Example 17

A mixture of 158.7 g. (0.767 m.) of dichloro-o- and p-ethylphenylphosphine, 52.0 g. (0.764 m.) of isoprene and 2.0 g. of copper stearate is warmed at 60° C. for twelve days. After cooling, a liquid layer of 25–30 cc. having a strong isoprene odor is decanted from the brown viscous lower layer, which is the phosphine dichloride adduct.

This is washed with petroleum ether, hydrolyzed with water and worked up as described in Example 1. Distillation gives 108.4 g. of liquid boiling at 164–168° C. (0.2 mm.) representing a 65% yield of crude monomeric phosphine oxide adduct and 46.1 g. of residue (27% yield). Purification by dissolving in two volumes of water, mixing with 50 cc. of 3% hydrogen peroxide, etc., as described in Example 1, gives 101.4 g. of distillate boiling at 165–170° C. (0.2–0.4 mm.), $n_D^{23.5}$ 1.5684, representing a 60% yield of pure adduct, and 4.3 g. of residue.

Analysis of liquid: Calcd. for $C_{13}H_{17}OP$: C=70.88%; H=7.78%; P=14.07%. Found: C=71.5%; H=7.8%; P=13.9%.

Example 18

A mixture of 194.6 g. (0.932 m.) of dichloro-p-methoxyphenylphosphine, 65 g. (0.954 m.) of isoprene and 1.0 g. of copper stearate is heated at 60° C. for eleven days and then held at room temperature for six days. The phosphine dichloride adduct is quite viscous, but not tarry. After washing with petroleum ether, water hydrolysis and extraction, distillation gives 58.8 g. of crude oil boiling at 188–190° C. (0.5–0.6 mm.), and 29.1 g. of residue (14%).

Purification in aqueous hydrogen peroxide and working up as in Example 1 gives 46.3 g. of a clear liquid boiling at 210–212° C. (0.6–0.8 mm.), $n_D^{23.5}$ 1.5754, a yield of 22% as pure adduct, and 3.0 g. of residue.

Analysis of the pure liquid: Calcd. for $C_{12}H_{15}O_2P$: C=64.85%; H=6.80%; P=13.94%. Found: C=64.7%; H=6.7%; P=13.9%.

Example 19

A mixture of 25 g. (0.097 m.) of dichloro-o- and p-bromophenylphosphine, 6.60 g. (0.097 m.) of isoprene and 2.0 g. of copper stearate is allowed to stand at 35–40° C. for two months. The phosphine dichloride adduct forms as a viscous, brown tar at a rate comparable to that of the ethylphenylphosphine system.

Hydrolysis and recovery by the procedure of Example 1 gives 9.80 g. of distillate boiling at 180–183° C. (0.6–0.8 mm.), a 37% yield of monomeric phosphine oxide adduct, and 10.0 g. of residue (38%).

Analysis of the liquid: Calcd. for $C_{11}H_{12}OBrP$: P=11.43%. Found: P=11.3%.

Example 20

A mixture of 60 g. (0.262 m.) of solid dichloro-alpha- and beta-naphthylphosphine, 17.9 g. (0.262 m.) of isoprene and 2.0 g. of copper stearate is warmed at 45° C. for one day. The phosphine dichloride adduct is seen as a red oil. To complete the reaction the mixture is warmed at 65° C. for one week, and then held for one more week at room temperature, giving a dark brown, tarry product.

Hydrolysis and distillation give 34.25 g. of a very viscous main fraction boiling at 215–230° C. (0.5 mm.) representing a 54% yield of crude phosphine oxide monomer, and 17 g. of residue (27% yield).

Analysis of the viscous liquid: Calcd. for $C_{15}H_{15}OP$: P=12.78%. Found: P=12.7%.

Example 21

A mixture of 9.10 g. of dichloromesitylphosphine, 2.90 g. of isoprene and 0.2 g. of copper stearate, after standing at 35–40° C. for one month, deposits the phosphine dichloride adduct as a red oil.

Example 22

In separate runs, isoprene is treated with about 4 mole equivalents of p-tolyl, p-xylyl and alpha-methoxynaphthyl dichlorophosphines at room temperature, using copper stearate as inhibitor. All give the products in the form of tars, the p-tolyl forming somewhat more rapidly than the other two. All of these oils are soluble in alcohol, and also in excess water.

Example 23

A mixture of 137.7 g. (1.05 m.) of dichloroethylphosphine (B. P. 113°), 75.0 g. (1.10 m.) of isoprene and 1.0 g. of copper stearate is heated at 60° C. for eleven days and then held at room temperature for six more days, giving a stiff, brown product.

This mixture is treated as in Example 1, using only about two water volumes in the hydrolysis step to facilitate the chloroform extraction. Distillation of the resulting crude phosphine oxide gives 89.2 g. boiling at 116–117° C. (0.5–0.6 mm.), $n_D^{23}$ 1.5049, or a 59% yield of monomeric adduct, and 12.4 g. of residue (8% yield).

Analysis of liquid: Calcd. for $C_7H_{13}OP$: C=58.35%; H=9.03%; P=21.52%. Found: C=58.6%; H=9.2%; P=21.5%.

Example 24

A mixture of 78.9 g. (0.316 m.) of dichloro-(2-chloro-1-octyl)-phosphine, 13.64 g. (0.200 m.) of isoprene and 0.3 g. of copper stearate is allowed to stand at room temperature for one week, 60° C. for four days and room temperature for one month. Dilution with petroleum ether gives the phosphine dichloride product as an insoluble red oil.

This is hydrolyzed with water, neutralized, salted, extracted with chloroform and distilled, giving 4.25 g. of a colorless liquid boiling at 165–167° C. (0.2 mm.). This liquid analyzes as follows:

Calcd. for $C_{13}H_{24}OClP$: Cl=13.50%; P=11.80%. Calcd. for $C_{13}H_{23}OP$: P=13.69%. Found: Cl=1.9%; P=13.3%.

It is apparent that 80–85% of the chlorine in the octyl chain has been split off. The yield is 9–10%, taking an average molecular weight of 230.

Example 25

Isoprene (19.1 g.) is treated with 50 g. of dichlorophenylphosphine without an inhibitor for five days at 40° C. to give the phosphine dichloride as a yellow solid-red oil mixture.

Working up this product as in Example 1 produces 40.5 g. of the phosphine oxide adduct boiling at 170–176° C. (1.3 mm.), representing a 75.5% yield of the corresponding phosphine oxide, and a 7.5% yield of residue (calculated as monomeric adduct).

Example 26

A mixture of dichlorophenylphosphine and trans-1-methyl-1,3-butadiene in 4:1 molar ratio, containing about 0.5% of copper stearate, is allowed to stand at room temperature for three days. The product appears in the form of a viscous oil.

This is washed with petroleum ether, hydrolyzed with water, neutralized, salted out, extracted with chloroform and distilled, giving a 12.2% yield of phosphine oxide adduct boiling at 160–180° C. (1 mm.), and a 28% yield of residue (calculated as monomeric adduct).

Example 27

A 1:1 molar mixture of dichlorophenylphosphine and trans-1-phenyl-1,3-butadiene containing 0.5% of copper stearate is allowed to stand at room temperature for nineteen days, producing a corresponding phosphine dichloride adduct in the form of crystals mixed with liquid.

This mixture is hydrolyzed and worked up as in the preceding example to give a 37.6% yield of crystalline phosphine oxide boiling at 224–226° C. (0.9 mm.) and melting at 96–98° C. These crystals analyze as follows:

Calcd. for $C_{16}H_{15}OP$: M. W.=254; C=75.6%; H=5.91%; P=12.21%. Found: M. W.=250; C=75.7%; H=6.1%; P=12.2%.

Example 28

A 100 g. run with dichlorophenylphosphine and 2-phenyl-1,3-butadiene at 1:1 molar ratio is made at room temperature for three days, using copper stearate as inhibitor. The reaction appears to be complete in about three hours. The mixed pale yellow crystal and liquid reaction product is hydrolyzed and treated as described in Example 1 to give an 82.1% yield of monomeric phosphine oxide adduct boiling at 235–240° C. (0.2 mm.) and melting at 125° C., and a 7% yield of residue calculated as monomeric adduct. The crystalline product analyzes as follows:

Calcd. for $C_{16}H_{15}OP$: M. W.=254; C=75.6%; H=5.91%; P=12.21%. Found: M. W.=248; C=76.1%; H=5.8%; P=12.3%.

Example 29

A mixture of dichlorophenylphosphine and 2,3-dimethyl-1,3-butadiene in 4:1 molar ratio, containing 0.01% N-phenyl-1-phenylazo-2-naphthanilamine as polymerizing inhibitor is allowed to stand at room temperature for five days. The resulting crystalline phosphine dichloride is isolated by filtration and then worked up in the manner described above to give a 46.4% yield of crystals boiling at 173–175° C. (0.3 mm.) and 10.0% yield of liquid boiling at 165–170° C. (0.3 mm.), or a 56.4% combined yield of phosphine oxide adduct. The yield of residue in the case is 40% calculated as monomeric adduct.

The crystalline portion of the product analyzes as follows: Calcd. for $C_{12}H_{15}OP$: P=15.05%. Found: P=15.0%.

When this example is carried out using N,N'-diphenyl quinonimine or N,N'-diphenyl quinonimine dioxide instead of N-phenyl-1-phenylazo-2-naphthanilamine as the inhibitor, yields of phosphine oxide adduct of about 73 and 80% respectively are obtained.

The heterocyclic phosphine oxides which are formed from the products made according to this invention are highly stable compounds and are effective insecticides and miticides.

I claim:

1. A process for preparing a substituted phosphacyclopentene dihalide having the formula:

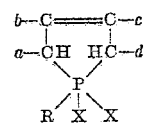

in which $a$, $b$, $c$ and $d$ represent members of the class consisting of hydrogen, alkyl, alkenyl, aryl, aralkyl, alkoxy, chlorine and bromine and tetramethylene groups which together with two adjacent carbon atoms in the heterocyclic ring form a cycloaliphatic ring, no more than a total of 6 carbon atoms being present in $a$, $b$, $c$ and $d$ in the form of aliphatic substituents and no more than 3 aromatic rings being present, in which R represents a member of the group consisting of alkyl, aryl, alkaryl, aralkyl, alkoxyaryl, haloaryl and haloalkyl radicals, and in which X represents a member of the group consisting of chlorine and bromine, which comprises reacting at a temperature between 0° and 100° C. a conjugated diene having the formula:

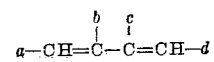

in which $a$, $b$, $c$ and $d$ have the significance described above, no more than a total of 6 carbon atoms being present in *a*, *b*, *c* and *d* in the form of aliphatic substituents and no more than 3 aromatic rings being present, substituents on the terminal carbon atoms of the butadiene structure being in the trans configuration, with a monosubstituted phosphorus dihalide having the formula $RPX_2$ in which R and X have the significance described above.

2. A process according to claim 1 in which the reaction between the diene and the mono-substituted phosphorus dihalide is carried out in the presence of a polymerization inhibitor selected from the group consisting of copper organic salts, imines and polynitro compounds.

3. A process for preparing 1-phenyl-1-phospha - 3 - cyclopentene - P - dichloride having the formula:

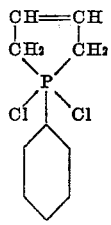

which comprises contacting butadiene with dichlorophenylphosphine at a temperature from 0° to 100° C.

4. A process for preparing 1-phenyl-3-methyl-1 - phospha - 3 - cyclopentene - P - dichloride having the formula:

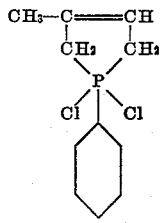

which comprises contacting isoprene with dichlorophenylphosphine at a temperature between 0° and 100° C.

5. A process for preparing 3-chloro-1-phenyl-1-phospha-3-cyclopentene-P-dichloride having the formula:

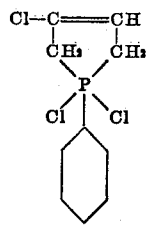

which comprises contacting chloroprene with dichlorophenylphosphine at a temperature between 0° and 100° C.

6. A process for preparing 1-ethyl-3-methyl-1-phospha-3-cyclopentene-P-dichloride having the formula:

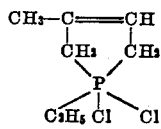

which comprises contacting isoprene with dichloroethylphosphine at a temperature between 0° and 100° C.

7. A process for preparing 1-phenyl-3(4'-methyl - 3' - pentenyl) - 1 - phospha - 3 - cyclopentene-P-dichloride having the formula:

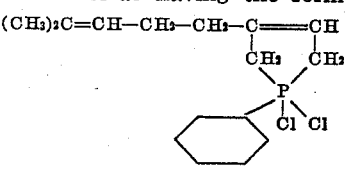

which comprises contacting 2-methyl-6-methylene-2,7-octadiene with dicholorophenylphosphine at a temperature between 0° and 100° C.

8. A composition obtained by the process of claim 1, said composition containing a substituted phosphacyclopentene dihalide in crude form.

WILLIAM B. McCORMACK.

References Cited in the file of this patent

UNITED STATES PATENTS

| Number | Name | Date |
|---|---|---|
| 2,160,915 | Schreider | June 6, 1939 |